D. S. HAWKINS.
INTERNAL COMBUSTION ENGINE.
APPLICATION FILED MAR. 14, 1916.
1,258,565.
Patented Mar. 5, 1918.
2 SHEETS—SHEET 1.
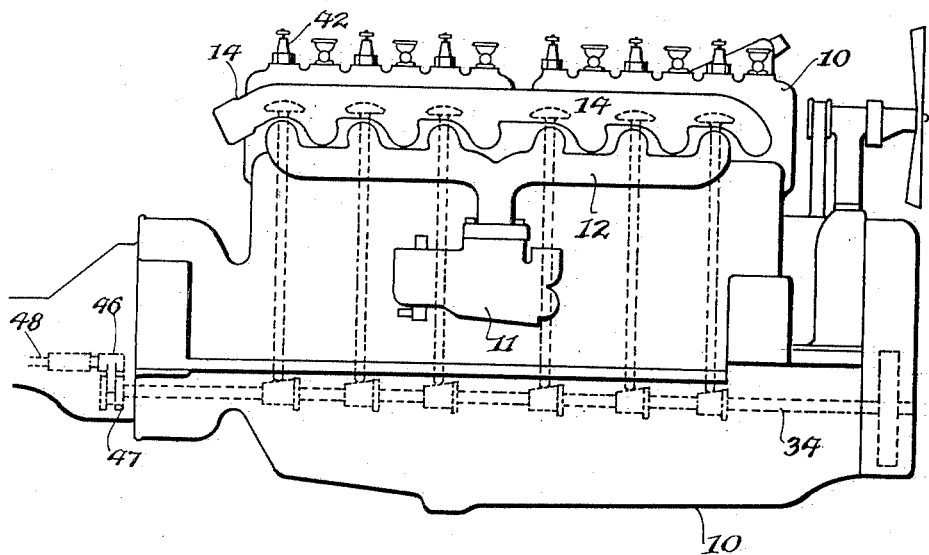
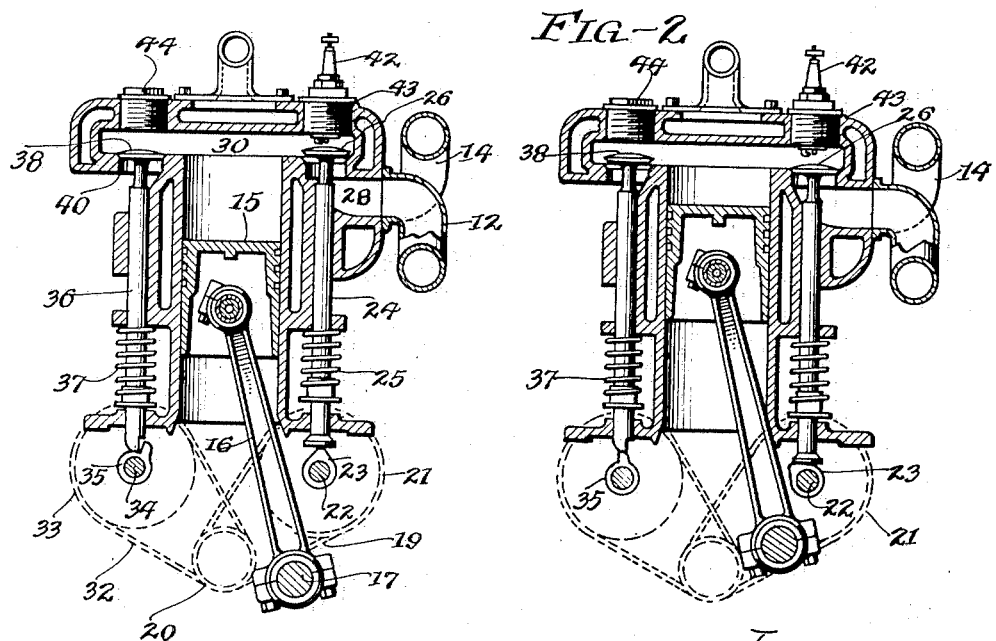
INVENTOR
David S. Hawkins,
BY Albert N. Baker,
ATTY

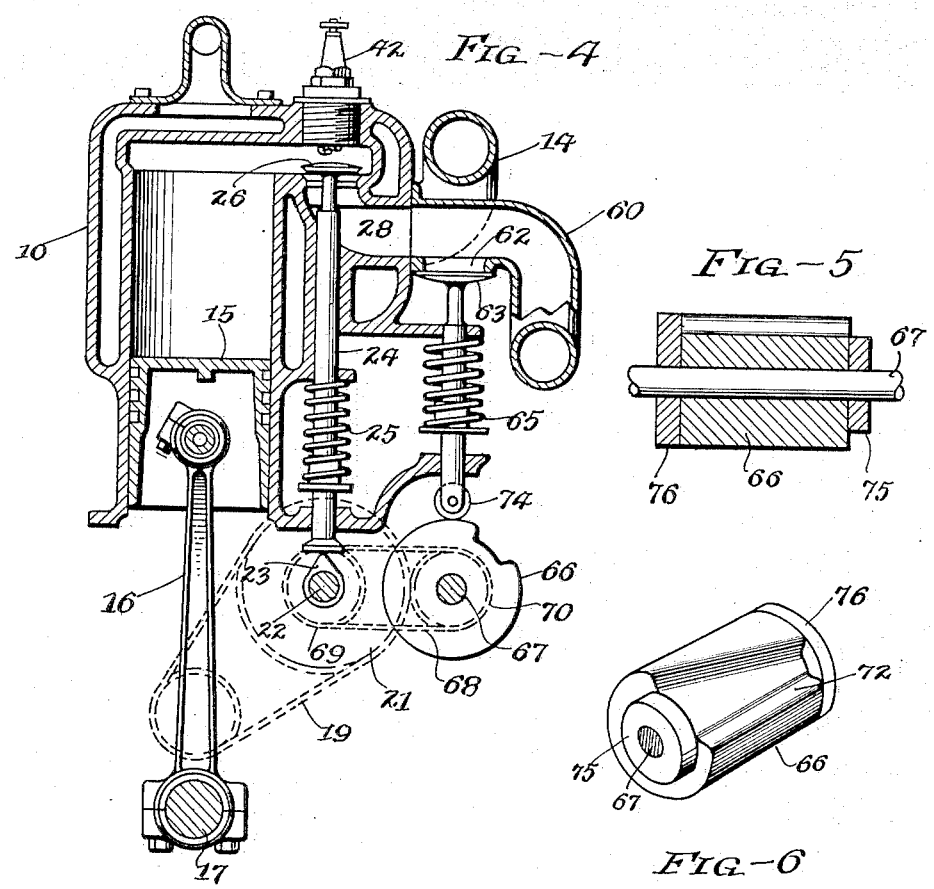
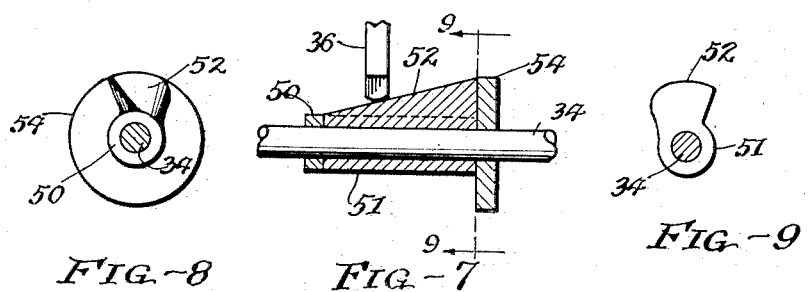

UNITED STATES PATENT OFFICE.

DAVID S. HAWKINS, OF CLEVELAND, OHIO.

INTERNAL-COMBUSTION ENGINE.

1,258,565.	Specification of Letters Patent.	Patented Mar. 5, 1918.

Application filed March 14, 1916.   Serial No. 84,032.

*To all whom it may concern:*

Be it known that I, DAVID S. HAWKINS, a citizen of the United States, residing at Cleveland, in the county of Cuyahoga and State of Ohio, have invented a certain new and useful Improvement in Internal-Combustion Engines, of which the following is a full, clear, and exact description, reference being had to the accompanying drawings.

This invention relates to internal combustion engines and has for its general object provision of devices for controlling the admission of air and the combustible mixture to the cylinders in such a manner as to provide a high efficiency of operation and secure greater economy in fuel consumption.

In accomplishing the above objects, I provide, in addition to the usual means for admitting a combustible mixture to the cylinders, a means for introducing into the cylinder outside air ahead of the combustible mixture, whereby the cylinder is charged with a body of air adjacent the piston, and between this body of air and the cylinder head is a layer of combustible mixture of hydrocarbon vapor and air which may be exploded in the usual manner.

I have found that the advantageous results secured by my arrangement are: that a smaller amount of combustible mixture than is usually required may operate efficiently; very uniform and even compression on the successive strokes is provided; the engine will operate effectively throughout a wider range of speeds; the body of air ahead of the combustible mixture forms a cushion absorbing the shock of the explosion, and on becoming heated by the explosion and by contact with the cylinder walls, acts expansively, utilizing heat otherwise wasted in the exhaust and in the jacket, and thus adds to the driving force actuating the piston. In addition to these, other advantages are gained, which will be hereinafter set forth.

My invention has advantages particularly useful for engines employed in motor vehicles, and further objects are to provide means enabling the admission of air only, to the cylinder or cylinders, whereby the engine may be run idly by the momentum of the vehicle, as is frequently desirable, without taking the combustible mixture into the cylinders which, not being used, would be wasted. By the same controlling means, which may be operated by the driver of the vehicle, the amount of air admitted to the cylinders, independently of that in the combustible mixture, may be varied according to different running conditions, by changing the duration of the period of time of the admission of air, as well as the area of the admission opening.

Other objects will become apparent in the following description which refers to the drawings, and the essential characteristics are hereinafter summarized in the claims.

Referring to the drawings, Figure 1 is a side elevation of an engine of a type commonly used in automobiles, showing the auxiliary air admission valves and the cam shaft for operating the same in dotted lines; Fig. 2 is a cross section through such a motor illustrating relative positions of the piston, air intake valve and combustible mixture controlling valve; Fig. 3 is a similar section illustrating these parts in a different position; Fig. 4 is a cross section through an engine such as shown in Fig. 1 illustrating a modified arrangement of my invention by which it may be adapted to existing forms of motors; Fig. 5 is a longitudinal section through one of the cams actuating the air admission valves; Fig. 6 is a perspective view of the same; Fig. 7 is a longitudinal section through the form of cam used to actuate the valves in the preferred form illustrated in Figs. 2 and 3; Fig. 8 is a section end elevation of such cam looking toward the right; Fig. 9 is a similar section taken on the line 9—9 of Fig. 7 and looking toward the left.

Referring to the drawings by reference numerals, 10 indicates a common form of engine frame shown as of the six cylinder type, provided with a suitable carbureter 11 and manifold tube 12 leading therefrom to the respective cylinders. 14 illustrates a suitable exhaust manifold leading from the respective cylinders, the exhaust valves not being shown. 15 indicates a suitable piston within the cylinder, 16 a connecting rod actuating the crank shaft indicated at 17, shown as connected by a suitable sprocket chain 19, running over wheels 20 and 21, the latter of which actuates a cam shaft 22. The cams 23 of the latter shaft are adapted to vertically reciprocate valve stems 24 against downwardly acting springs 25 thereby controlling the combustible mixture intake valves 26.

28 is an intake passage to which leads a portion of the manifold 12, the passage being controlled by the valve 26 to admit the combustible mixture to the chamber 30.

Driven by a sprocket chain 32 is a sprocket wheel 33 actuating a cam shaft 34, carrying cams 35 adapted to intermittently raise valve stems 36 against the action of springs 37 to open valves 38 controlling air intake passages 40, leading to the combustion chamber 30. For convenience in describing my invention, the combustible mixture admitted through the intake manifold 12 and passage 28 which may be natural gas, gasolene vapor or any other suitable fuel mixed with air in the usual manner, will be hereinafter referred to as gas, and to suitably distinguish therefrom the outside atmospheric air admitted through the passage 40, will be designated simply air.

At 42 are indicated suitable spark plugs for igniting the charge shown in Figs. 2, 3 and 4, as mounted in bushings 43 fitting threaded openings of such size as to conveniently admit the valve heads 26 for assembling purposes. Immediately above the valve heads 38 are openings provided for conveniently assembling these valves into position, the openings being closed by suitable plugs illustrated at 44.

In order to provide for varying the opening movement of the valves 38 and the time during which they may be held open, the cam shaft 34 is made longitudinally shiftable, and the shifting movement may be accomplished by any suitable means, such for example, as a bifurcated member 46 engaging a grooved collar 47 on the shaft 34 and actuated by a slidable shaft 48, which may be connected with any suitable device controlled by the operator.

It will be seen from Figs. 7 to 9 that the cams on the shaft 34 have tapered actuating surfaces whereby the shifting movement may vary the amount of air admitted to the cylinders. In the form shown, these cams are provided with a cylindrical rest portion 50 at one end of the cam, while the body of the cam has a cylindrical portion 51 of substantially the same size as the rest portion 50 and adapted to permit the closure of the valve, and along the body portion extends a raised tapered actuating surface 52 so arranged that the valve may be opened at the same time with relation to the piston irrespective of the relative position of the cam and valve stem, but as the cam is moved to the left, in Fig. 7, higher and wider portions of the actuating surface are brought under the valve stem so that the valve will be opened greater distances and through greater portions of the rotary movement of the cam. At the large end of the cam is provided a cylindrical rest portion 54 which may be brought under the valve stem to maintain the valve continuously in an open position when desired.

The operation of the embodiment of my invention just described, is as follows: The engine shown is a four-cycle type, and on the first portion of the movement of the intake stroke of the piston the valve 26 remains closed, the cams 23 being set to open at a later time than in the usual operation. During this period the valves 38 are opened admitting air from the outside. This relative position of the gas inlet and air intake valves is shown in Fig. 2 with the piston in the early portion of its downward movement, and it will be noted from this figure that the cams 35 will soon reach a position permitting the spring 37 to close the valves 38, and by that time the cams 23 will raise the valves 26, opening the same, and at this time the piston will have reached a lower position, illustrated in Fig. 3. Thus the air from the outside will have filled the chamber space, and on the completion of the piston stroke will follow the piston, and a further suction will cause the gas to enter the upper portion of the chamber, thus, in effect, forming a layer of combustible mixture above a layer or body of atmospheric air. On the return stroke of the piston this charge of air and gas will be compressed and the combustible portion will be ignited by the spark plugs, in the usual manner.

The explosion following the ignition will act downwardly on the piston, through the interposed body of air, thus cushioning the explosive effect of combustion and modifying the sudden impulse upon the piston, causing the engine to operate with less vibration, and this air, being heated by the combustion as well as by contact with the cylinder walls, will act expansively, resulting in a driving force on the piston of much greater duration and a lower initial pressure than would otherwise be obtained with the same charge of gas.

If the engine is running slowly, the air may be admitted through a smaller opening and through a greater length of time than if the engine is running rapidly, and the remaining portion of the intake stroke, during which the gas is admitted, may be relatively shorter, and this regulation of the admission of the air is secured by shifting the cam shaft longitudinally bringing different actuating surfaces of the cams into operative contact with the valve stems. If the engine is running rapidly the amount of fuel required is usually greater and accordingly the amount of air admitted ahead of the gas may be made correspondingly less by an adjustment of the cam shaft so that the volume of gas in the charge may be greater.

In any instance the chamber space formed by the outward stroke of the piston may be completely filled by the body of air and that of the gas in varying proportions so that the compression may invariably remain uniform and the efficiency of the engine be correspondingly raised. Furthermore, the heat utilized in expanding the air between the charge of gas and the piston, thus adding to the driving force, is an effective manner of preventing the loss of this heat through the cylinder jacket and the exhaust gases. In other words, in the ordinary operation of internal combustion engines, a large proportion of the B. T. U's in a given charge are wasted, while with the use of my invention the air ahead of the combustible mixture is caused to utilize a very considerable portion of the B. T. U's converted into driving energy.

In Figs. 4 to 6 I have shown a modified embodiment of my invention by which it may be readily adapted for use with existing forms of motors. In this form the engine frame, piston, connecting rod, intake valves, and means driving the same by the connecting rod are indicated by the same numerals and are substantially of the same construction as those heretofore described. Instead of providing the air inlet port at the opposite side of the piston from the gas inlet port, which necessitates a material change in the form of a cylinder head, I provide the air inlet valve in a specially formed intake manifold and in as close proximity to the cylinder as possible. At 60 is indicated such an intake manifold leading to the inlet passage 28 and preferably having on its lower side immediately adjacent the cylinder a comparatively large inlet opening 62 adapted to be closed by a valve 63. This valve is mounted on a vertically reciprocating stem, normally pressed downwardly by a spring 65 into engagement with a cam member 66 on an auxiliary cam shaft 67, driven by a sprocket chain indicated at 68 and running over sprocket wheels 69 and 70 of the shafts 22 and 67 respectively. This cam member 66 is shown as cylindrical through a greater portion of its surface, but provided with a longitudinal depression 72, wider at one point than at another whereby it may permit the opening of the valve for its full area when in one position and may be moved to other positions varying the amount of time during which the valve is opened.

The operation of this construction is substantially the same as that of the embodiment first described, but except where it is desired to apply my invention to an existing engine the form first described is preferable, in that it permits the usual gas intake valve to be positively closed during the time while the air is being admitted to the cylinder. However, by making the intake port 62 of large size and close to the cylinder, the amount of gas which will be drawn into the cylinder with the air will be comparatively small, not materially influencing the advantages gained by my invention.

As shown, the cam member for actuating the valve 63 engages a roller 74 which may ride on a rest portion 75 at one end of the cam, leaving the valve entirely open, or on a rest portion 76 at the opposite end of the cam, which is cylindrical and maintains the valve continuously closed. These rest portions and any position between the same, may be brought under the roller 74 by the longitudinal shifting of the cam shaft 67 by such means as is illustrated in connection with the shaft 34.

It will be seen from the foregoing description that by my invention very uniform and even compression on the successive strokes is provided because the maximum cylinder space is always filled either by air alone or varying proportions of air and gas, or entirely by gas. A weak combustible mixture such as is used when an engine of the usual present construction engine is running slowly, developing a small portion of its power, does not normally fill the chamber space and partial vacuum is formed during the outer portion of the piston stroke, and the compression at the inner end of the stroke is comparatively low, which impairs the effectiveness of the combustion. Accordingly, by producing an even compression and holding the gas in a body or layer at the inner end of the combustion chamber, the desired compression is obtained, consequently an effective combustion, and such combustion is effectively used by causing it to heat and expand the air between it and the piston.

It has been determined by experiment that equal parts of air and air mixed with a vapor, such as gasolene vapor or a combustible mixture requires several seconds' time to co-mingle in a space comparable to the combustion chamber, and accordingly, in using my invention the air entering the combustion chamber ahead of the gas has very little tendency to weaken the gas mixture and as the charge is compressed combustion takes place in a small fraction of a single second. The gas mixture is substantially as rich at the explosion as when entering the cylinder.

The intake ports are normally arranged so that the incoming air and gas has no tendency to travel in paths longitudinally of the cylinder which might cause the air and gas to co-mingle, but with the usual engine and those designed to embody my invention ports are so arranged that the air and gas have very little tendency to co-mingle previous to the combustion.

The advantage heretofore mentioned of permitting the engine to be driven by momentum, as for example when a motor vehicle is coasting down a grade while admitting only air to the cylinder under the control of the shiftable cams, has the advantage not only of the saving of fuel but prevents the filling of the exhaust passages with combustible fuel which is liable to be exploded by the hot gases from the exhaust when the normal operation of the engine is resumed, thus resulting in damaging the parts, such for example as the blowing off the usual muffler as consequence of such explosion. This supplying of air during coasting, acts as a brake to retard the engine, and may also serve to cool off the operating parts.

Having thus described my invention, what I claim is:

1. In an internal combustion engine, the combination with a continuous cylinder, piston, connecting rod and crank, of a passageway for combustible mixture and a passageway for unmixed air, both leading to the cylinder, independent valves for controlling the two passageways mentioned, cams rotated by the crank shaft for operating the respective valves, the cam which operates the air valve being of varying extent, and means for shifting the last mentioned cam while the engine is operating.

2. In an internal combustion engine, the combination with the cylinder and piston, of passageways for combustible mixture and for air, independent valves controlling the admission of combustible mixture and air due to the suction stroke of the piston, two lay shafts provided with cams for operating the respective valves, and means for longitudinally shifting the lay shaft which operates the air admission valve, the cam on the last mentioned shaft being of varying extent.

3. In an internal combustion engine, the combination with a cylinder, piston, connecting rod and crank, of a passageway for combustible mixture and a passageway for unmixed air, both leading to the cylinder, independent valves for controlling the two passageways mentioned, two lay shafts geared with the crank shaft, a cam on one of said lay shafts operating the combustible mixture valve, a cam of varying extent on the other lay shaft operating the air valve, and means for manually shifting the last mentioned lay shaft while the engine is operating.

In testimony whereof, I hereunto affix my signature.

DAVID S. HAWKINS.